US012057651B2

(12) United States Patent
Kim et al.

(10) Patent No.: US 12,057,651 B2
(45) Date of Patent: Aug. 6, 2024

(54) PLUG CONNECTOR FOR BOARD-TO-BOARD CONNECTOR AND CONNECTOR ASSEMBLY INCLUDING THE SAME

(71) Applicant: Molex, LLC, Lisle, IL (US)

(72) Inventors: Suk Min Kim, Seoul (KR); Jin Hyup Chang, Ansan-si (KR)

(73) Assignee: Molex, LLC

(*) Notice: Subject to any disclaimer, the term of this patent is extended or adjusted under 35 U.S.C. 154(b) by 372 days.

(21) Appl. No.: 17/706,598

(22) Filed: Mar. 29, 2022

(65) Prior Publication Data

US 2022/0320772 A1 Oct. 6, 2022

(30) Foreign Application Priority Data

Apr. 2, 2021 (KR) ........................ 10-2021-0043274
Jun. 1, 2021 (KR) ........................ 10-2021-0070769

(51) Int. Cl.
*H01R 12/71* (2011.01)
*H01R 13/504* (2006.01)
*H01R 13/629* (2006.01)

(52) U.S. Cl.
CPC ....... *H01R 12/716* (2013.01); *H01R 13/5045* (2013.01); *H01R 13/629* (2013.01)

(58) Field of Classification Search
CPC ...... H01R 12/716; H01R 12/73; H01R 13/20; H01R 13/405; H01R 13/5045; H01R 13/629; H01R 13/6582
See application file for complete search history.

(56) References Cited

U.S. PATENT DOCUMENTS 7,648,391 B2 * 1/2010 Nishimura ........... H01R 33/975 439/564
7,815,467 B2 * 10/2010 Tsuchida .............. H01R 12/716 439/607.09

(Continued)

FOREIGN PATENT DOCUMENTS

CN 109950727 A 6/2019
CN 209544655 U 10/2019

(Continued)

*Primary Examiner* — Abdullah A Riyami
*Assistant Examiner* — Thang H Nguyen

(57) ABSTRACT

A plug connector according to an embodiment includes: a connector main body which includes one pair of first side-walls extended in a first direction and facing each other, and one pair of second sidewalls extended in a second direction perpendicular to the first direction, and facing each other; one pair of fitting nails which are coupled to the connector main body; and a plurality of plug terminals which are coupled to the one pair of second sidewalls, wherein each of the one pair of fitting nails includes: an upper surface which is in contact with an upper end of the first sidewall; a central reinforcement portion which is curved downward from the upper surface to come into contact with at least a portion of an outer surface of the first sidewall; and one pair of lateral reinforcement portions which are extended from both ends of the upper surface in the second direction to come into contact with an upper end of the second sidewall, wherein the central reinforcement portion includes a central solder portion which is extended downward from a lower end of the central reinforcement portion and encloses at least a portion of a lower surface of the first sidewall, wherein each of the one pair of lateral reinforcement portions includes: a first outer wall terminal which is extended downward; a second outer wall terminal which is spaced apart from the first outer wall terminal in the second direction and is extended down-ward; and a first inner wall terminal which is spaced inward (Continued)

from the second outer wall terminal and is extended downward, wherein each of the one pair of lateral reinforcement portions includes a lateral solder portion which is extended downward from at least one of the first and second outer wall terminals and encloses at least a portion of a lower surface of the second sidewall.

8 Claims, 8 Drawing Sheets

(56) References Cited

U.S. PATENT DOCUMENTS

| | | | | |
|---|---|---|---|---|
| 10,897,097 | B2 * | 1/2021 | Hirakawa | H01R 13/115 |
| 11,011,874 | B2 * | 5/2021 | Kitazawa | H01R 12/716 |
| 11,522,309 | B2 * | 12/2022 | Yanase | H01R 13/193 |
| 11,916,323 | B2 * | 2/2024 | Maeda | H05K 1/0225 |
| 2006/0141811 | A1 * | 6/2006 | Shichida | H01R 24/50 439/63 |
| 2018/0054013 | A1 * | 2/2018 | Osaki | H01R 13/05 |
| 2018/0358729 | A1 * | 12/2018 | Chen | H01R 12/7088 |
| 2018/0366843 | A1 * | 12/2018 | Maki | H01R 24/42 |
| 2019/0115692 | A1 * | 4/2019 | Tanaka | H01R 12/774 |
| 2020/0235505 | A1 * | 7/2020 | Ono | H01R 13/631 |
| 2020/0295484 | A1 * | 9/2020 | Kobayashi | H01R 12/73 |
| 2022/0140534 | A1 * | 5/2022 | Hoshiba | H01R 12/73 439/74 |

FOREIGN PATENT DOCUMENTS

| | | | | |
|---|---|---|---|---|
| CN | 210607897 | U | 5/2020 | |
| JP | H07230837 | A | 8/1995 | |
| JP | 2015220005 | A | 12/2015 | |
| JP | 2020149926 | A | 9/2020 | |
| JP | 2020184459 | A | 11/2020 | |
| JP | 2020202095 | A | 12/2020 | |
| KR | 20170004840 | A | 1/2017 | |
| KR | 20190020613 | A | 3/2019 | |
| KR | 20190061351 | A | 6/2019 | |
| KR | 20200088637 | A | 7/2020 | |
| TW | I707505 | B | 10/2020 | |
| WO | WO-2016178356 | A1 * | 11/2016 | H01R 12/707 |
| WO | WO-2017053149 | A1 * | 3/2017 | H01R 12/732 |
| WO | WO-2017212862 | A1 * | 12/2017 | H01R 12/707 |

* cited by examiner

PLUG CONNECTOR FOR BOARD-TO-BOARD CONNECTOR AND CONNECTOR ASSEMBLY INCLUDING THE SAME

RELATED APPLICATIONS

The present application claims priority to Korean Patent Application No. 10-2021-0070769 filed on Jun. 1, 2021 and 10-2021-0043274 filed on Apr. 2, 2021 which are incorporated by reference in their entireties.

TECHNICAL FIELD

The present disclosure relates to a plug connector for a board-to-board connector, and a connector assembly including the same. More particularly, the present disclosure relates to a plug connector for a board-to-board connector which is configured to be mounted on a surface of a board to electrically connect the board, and a connector assembly including the same.

BACKGROUND ART

In related-art technology, a plug connector and a receptacle connector of a board-to-board (BTB) connector are used to electrically connect one pair of boards. Such connectors may be installed on opposite surfaces of one pair of circuit boards, respectively, and may be configured to be press-fitted into each other and to conduct electricity. The plug connector and the receptacle connector may be components of a connector assembly.

According to the trend toward miniaturization of electronic devices, miniaturization and a low profile of a connector may be required. As the connector is miniaturized and has a low profile, durability of the connector may be degraded, and, when the connector is coupled with a corresponding connector by press-fitting, a connector body (for example, a mold portion of the connector) may be easily deformed or broken due to relative position misalignment, etc. In order to prevent damage to the connector body and to provide electrical connection at both ends of the connector, simultaneously, fitting nails (or reinforcement metal fittings) may be positioned at both ends of the connector to maintain a press-fitting state with the corresponding connector.

Typically, the fitting nail provided with an electric contact terminal as a power terminal may have a portion thereof directly and electrically connected with a board on which the connector is mounted. As power current supply required by the board increases, the number of power terminals of the fitting nails may be required to increase. When a surface mount technology (SMT) process such as soldering is performed to electrically connect the power terminals of the fitting nails and the board, a solder wick in which a solder moves toward the connector from the board and ascends may occur. When the solder wick occurs on the connector, electrical connection of the connector may become unstable. In addition, when the solder wick occurs, durability of the connector may be degraded.

Embodiments of the present disclosure provide a plug connector for a board-to-board connector which prevents a solder wick of fitting nails while providing more power terminals to the fitting nails, and has stable electrical connection of power terminals of a connector when the connector is coupled by press-fitting, and a connector assembly including the same.

An embodiment provides a plug connector for a board-to-board connector.

The plug connector includes: a connector main body which includes one pair of first sidewalls extended in a first direction and facing each other, and one pair of second sidewalls extended in a second direction perpendicular to the first direction, and facing each other; one pair of fitting nails which are over-molded in the connector main body; and a plurality of plug terminals which are over-molded in the one pair of second sidewalls, wherein each of the one pair of fitting nails includes: an upper surface which is in contact with an upper end of the first sidewall; a central reinforcement portion which is curved downward from the upper surface to come into contact with at least a portion of an outer surface of the first sidewall; and one pair of lateral reinforcement portions which are extended from both ends of the upper surface in the second direction to come into contact with an upper end of the second sidewall, wherein the central reinforcement portion includes a central solder portion which is extended downward from a lower end of the central reinforcement portion and encloses at least a portion of a lower surface of the first sidewall, wherein each of the one pair of lateral reinforcement portions includes: a first outer wall terminal which is extended downward; a second outer wall terminal which is spaced apart from the first outer wall terminal in the second direction and is extended downward; and a first inner wall terminal which is spaced inward from the second outer wall terminal and is extended downward, wherein each of the one pair of lateral reinforcement portions includes a lateral solder portion which is extended downward from at least one of the first and second outer wall terminals and encloses at least a portion of a lower surface of the second sidewall.

The central solder portion may be extended downward from the lower end of the central reinforcement portion, may be curved to be convex toward an inner surface of the first sidewall, and may enclose at least a portion of the lower surface of the first sidewall.

The lateral solder portion may be extended downward from the first outer wall terminal, may be curved to be convex toward an inner surface of the first sidewall, and may enclose at least a portion of the lower surface of the second sidewall.

The lateral solder portion may further be extended in the second direction, and a length of the lateral solder portion in the second direction may be longer than a length of the first outer wall terminal in the second direction.

The one pair of fitting nails may be embedded in the connector main body, so that the central reinforcement portion is exposed, at least a portion of a lower surface of the central solder portion is exposed to a lower side, and the other portion of the central solder portion is not exposed, an exposed portion of the central reinforcement portion and the exposed portion of the lower surface of the central solder portion may be separated from each other and exposed with the connector main body being disposed therebetween, and the exposed portion of the central reinforcement portion may form an electrical contact terminal.

The one pair of fitting nails may be embedded in the connector main body, so that the first outer wall terminal and the second outer wall terminal are exposed to an outside, the first inner wall terminal is exposed to an inside, and the one pair of lateral solder portions are exposed to a lower side, and an exposed portion of a lower surface of the lateral solder portion and exposed portions of the lateral reinforcement portion may be separated from each other and exposed with the connector main body being disposed therebetween.

At least one recess may be formed on the central reinforcement portion as an electrical contact terminal.

According to another embodiment, a connector assembly is provided.

The connector assembly includes: a plug connector according to an embodiment; and a receptacle connector engaged with the plug connector.

According to embodiments of the disclosure, while more power terminals are provided to the fitting nails, a solder wick can be prevented from occurring on the fitting nails of the plug connector in a surface mount technology process.

According to embodiments of the disclosure, a plurality of power terminals (for example, three terminals on each lateral reinforcement portion) may be formed on each fitting nail, so that a stable electrical contact point can be guaranteed. Accordingly, stable electrical connection is possible even at a high current.

According to embodiments, the area of the lateral solder portion of the fitting nail may increase, and a contact failure of the connector may be prevented, and adhesion to a board may be enhanced.

According to embodiments of the disclosure, when the plug connector is press-fitted into the connector, stable electrical connection of a power terminal of the connector may be provided.

According to embodiments of the disclosure, hardness of the connector may increase and durability of the plug connector may be enhanced.

DETAILED DESCRIPTION OF THE PREFERRED EMBODIMENT

Embodiments of the present disclosure are illustrated for the purpose of explaining the technical concept of the present disclosure. The right scope of the present disclosure is not limited to embodiments suggested hereinbelow or detailed descriptions of these embodiments.

An 'embodiment' in the disclosure is just classification for easily explaining the technical concept of the present disclosure, and the respective embodiments do not need to be exclusive to each other. For example, components disclosed in an embodiment may be applied to and implemented in other embodiments, and may be changed to be applied and implemented without departing from the scope of the present disclosure.

All technical terms and scientific terms used in the present disclosure have meanings normally understood by those skilled in the art to which the present disclosure belongs unless otherwise defined. All terms used in the present disclosure are selected for the purpose of explaining the present disclosure more clearly, and are not selected to limit the right scope of the present disclosure.

It should be understood that the terms "comprise", "include", "have" used in the present disclosure are open-ended terms that have possibility of including other embodiments unless phrases or sentences including corresponding expressions indicate otherwise. In addition, the term "unit" or "module" used in the present disclosure refers to a unit processing at least one function or operation, and may be implemented by hardware, software, or a combination of hardware and software.

The singular forms used in the present disclosure may include the plural forms as well unless the context clearly indicates otherwise, and this is equally applied to the singular forms described in the claims.

Such terms "first" and "second" used in the present disclosure are used to simply distinguish a plurality of components from one another, and do not limit the components in the aspect of order or importance.

Figure 1:
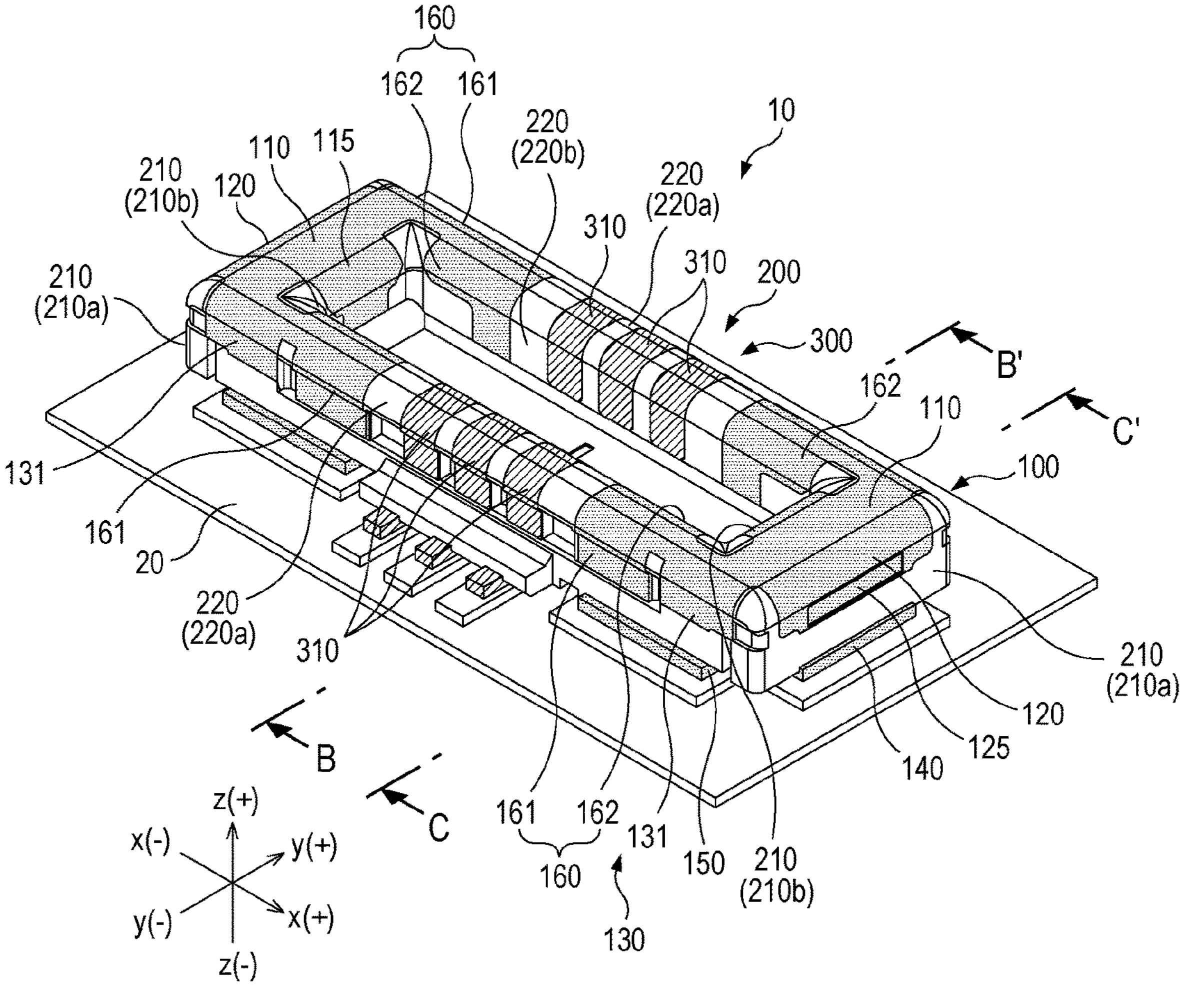
FIG. 1 is a perspective view of a plug connector including a connector main body, one pair of fitting nails, and a plurality of plug terminals, as viewed from one direction according to an embodiment.

A direction indicating term such as "upper side," "upward," etc. used in the present disclosure refers to a direction in which a plug connector 10 is positioned with reference to a board 20, and a direction indicating term such as "lower side," "downward," etc. refers to a direction opposite thereto with reference to FIG. 1. This is merely a reference for explaining the disclosure to be clearly understood, and the upper side and the lower side may be differently defined according to where the reference is set.

Throughout the specification, a "longitudinal direction" of a component may be a direction in which the component is extended along one-direction axis of the component, and in this case, the one-direction axis of the component refers to a direction in which the component is extended longer than the other direction axis perpendicular to the one-direction axis.

The coordinates system shown in the drawings of the present disclosure illustrates an x-axis, a y-axis, and a z-axis. However, the x, y, z-axis directions shown in the drawings refer to relative directions that are arbitrarily defined for convenience of explanation, and may be changed according to necessity.

It is to be understood that, if an element is referred to as "connected with" another element, it means that the element may be directly connected with another element or may be connected with another element via another new element.

Hereinafter, embodiments of the present disclosure will be described with reference to the accompanying drawings. In the accompanying drawings, the same reference numerals are used for the same or corresponding components. In explaining the following embodiments, a redundant explanation of the same or corresponding components may be omitted. However, even when description of a component is omitted, it is not intended that the component is not included in a certain embodiment.

FIG. 1 is a perspective view of a plug connector 10 for a board-to-board connector according to an embodiment of the present disclosure. The plug connector 10 may be configured to be mounted on a surface of a board 20 for the sake of electrical connection of the board 20. Herein, the board 20 illustrated is merely an example and a shape, a size, etc. of the board 20 may be changed according to necessity as long as the plug connector 10 can be mounted thereon. The plug connector includes a connector main body 200, one pair of fitting nails 100 (see FIGS. 2A to 2C), and a plurality of plug terminals 300. The connector main body 200 includes one pair of first sidewalls 210 which are extended along a first direction (y-axis direction) and face each other, and one pair of second sidewalls 220 which are extended along a second direction (x-axis direction) perpendicular to the first direction, and face each other. The y-axis direction shown in the drawing may refer to the first direction, and the x-axis direction may refer to the second direction. In addition, a z-axis direction may refer to a vertical direction. The plug connector 10 may be longer extended in the second direction (x-axis direction) than in the first direction (y-axis direction), but the shape of the plug connector 10 is not limited hereto.

The plug connector 10 may include the connector main body 200 in which a concave portion 250 is formed. The connector main body 200 may include one pair of first sidewalls 210 extended in parallel with each other in the first direction. The connector main body 200 may include one pair of second sidewalls 220 extended in parallel with each other in the second direction. A length of the first sidewall 210 in the first direction may be shorter than a length of the second sidewall 220 in the second direction. The concave portion 250 formed in the connector main body 200 may be enclosed by the one pair of first sidewalls 210 and the one pair of second sidewalls 220. Regarding the configuration of the plug connector 10 in the following example, a direction of the connector main body 200 facing the concave portion 250 may be an inward direction. In addition, a direction of the connector main body 200 that goes far away from the concave portion 250 may be an outward direction.

Figure 7:
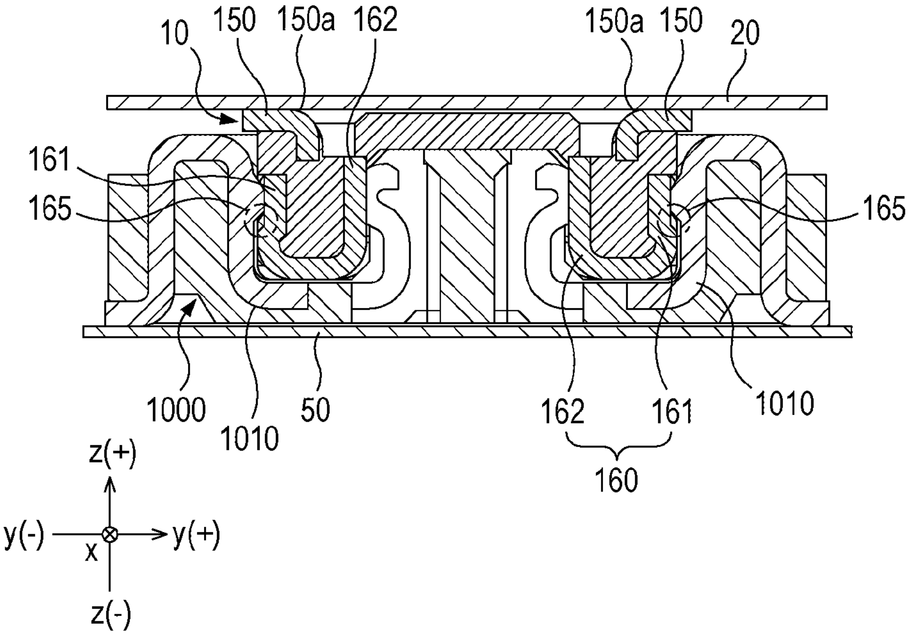
FIG. 7 is a cross-sectional view when the plug connector shown in FIG. 1 comes into contact with a corresponding connector.

Hereinafter, the plug connector 10 including the one pair of fitting nails 100 according to an embodiment will be described with reference to FIG. 1 and FIGS. 2A to 2C. The one pair of fitting nails 100 may be configured to be over-molded in the connector main body 200 by soldering. The one pair of fitting nails 100 may be over-molded in the connector main body 200 to prevent the connector 10, 1000 from being easily deformed or damaged when the plug connector 10 is press-fitted into a receptacle connector 1000 (FIG. 7). The fitting nails 100 may provide terminals for electric connection at both ends of the plug connector 10. Herein, the terminals provided by the fitting nails 100 may be power terminals.

The plug connector 10 may include the fitting nails 100 which are over-molded at both ends of the connector main body 200. The both ends of the connector main body 200 may be both ends facing each other in the x-axis direction. An upper surface 110 of the fitting nail 100 may be in contact with an upper end of the first side wall 210 of the connector main body 200, and may be extended in the y-axis direction. The upper surface 110 of the fitting nail 100 may be in contact with the upper end of the first sidewall 210 to protect the first sidewall 210.

Figure 2A:
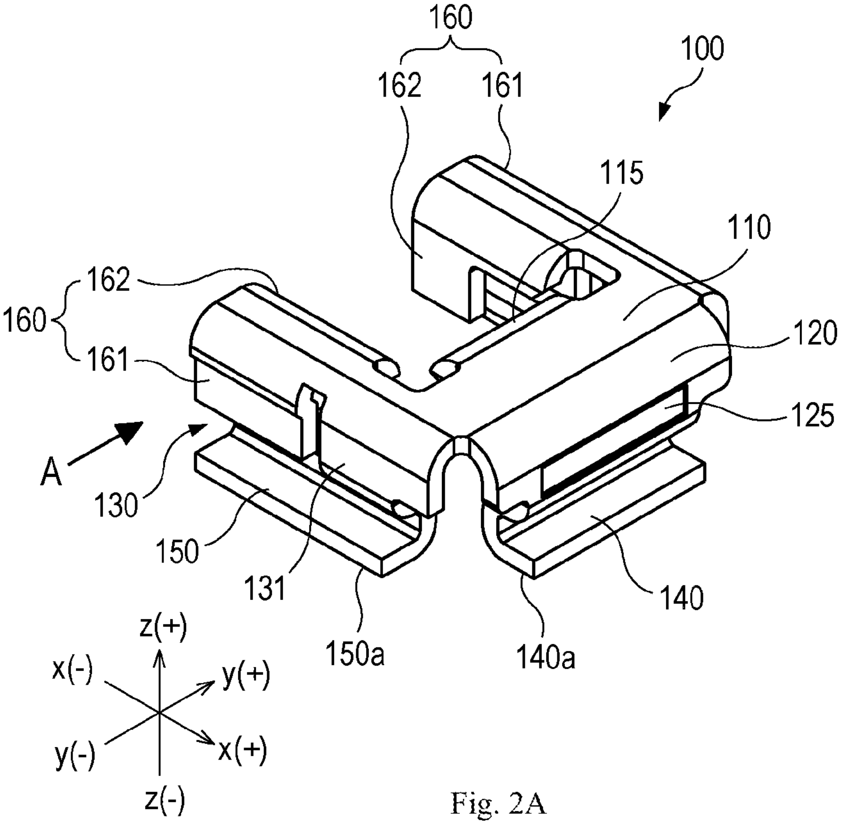
FIG. 2A is a perspective view of the fitting nail as viewed from one direction according to an embodiment.
Figure 2B:
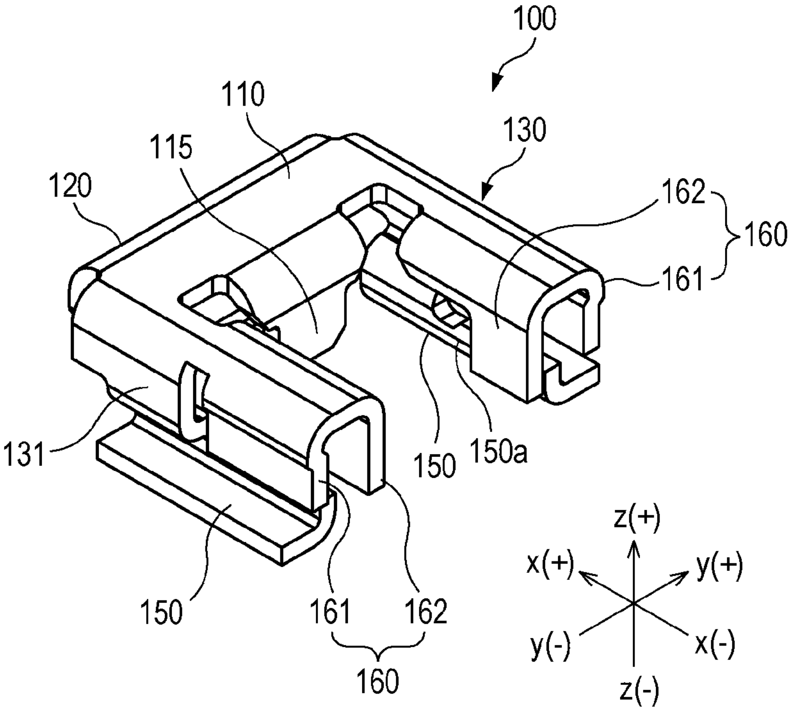
FIG. 2B is a perspective view of the fitting nail shown in FIG. 2A as viewed from another direction.
Figure 2C:
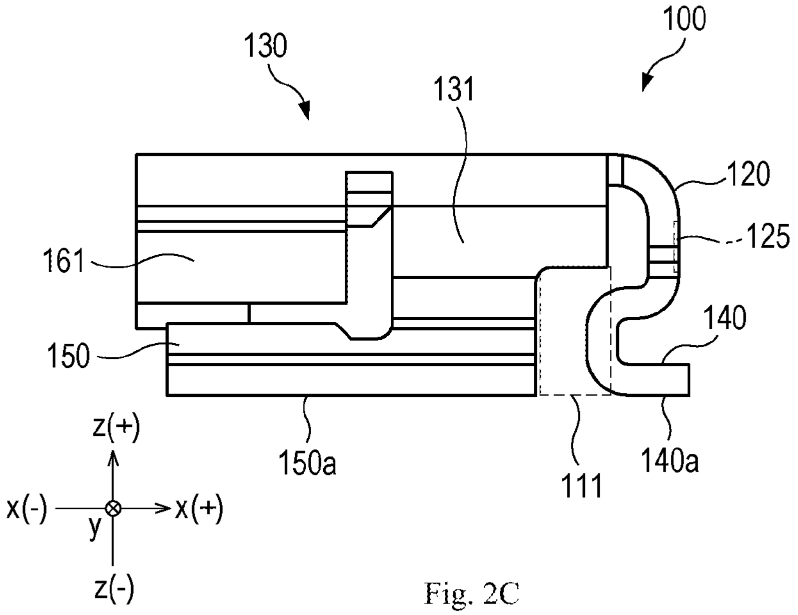
FIG. 2C is a side view of the fitting nail shown in FIG. 2A as viewed from the A direction.

FIG. 2A is a perspective view of the fitting nail 100 as viewed from one direction according to an embodiment. FIG. 2B is a perspective view of the fitting nail 100 shown in FIG. 2A as viewed from another direction. FIG. 2C is a side view of the fitting nail 100 shown in FIG. 2A as viewed from the A direction. The fitting nail 100 may be integrally formed by processing, for example, perforating, bending a metal plate.

In the following description, the fitting nail 100 will be described in detail on the assumption that a direction and a position are set with reference to the fitting nail 100 positioned in the (±) direction of the x-axis direction of FIG. 1, but it is obvious to those skilled in the art that the corresponding descriptions are equally applied to a direction and a position which are symmetrical with reference to the fitting nail 100 positioned in the (−) direction of the x-axis direction.

The fitting nail 100 may include a central reinforcement portion 120 curved downward from the upper surface 110 to come into contact with at least a portion of an outer surface of the first sidewall 210. The central reinforcement portion 120 may be curved downward from one side of the upper surface 100 of the fitting nail 100 in the x-axis direction. At least one recess 125 may be formed on the central reinforcement portion 120. The recess 125 formed on the central reinforcement portion 120 may be configured to maintain electrical connection between the central reinforcement portion 120 and a target contacting the central reinforcement portion 120 (that is, a corresponding portion of a fitting nail of the receptacle connector).

The fitting nail 100 may include an extended reinforcement portion 115. The extended reinforcement portion 115 may be curved downward from the other side of the upper surface 110 in the x-axis direction. The central reinforcement portion 120 and the extended reinforcement portion 115 may face each other. The extended reinforcement portion 115 and the central reinforcement portion 120 may be spaced apart from each other by a predetermined distance.

The central reinforcement portion 120 may include a central solder portion 140 further extended downward from a lower end of the central reinforcement portion 120. The central solder portion 140 may be extended downward and may be curved convexly. For example, the central solder portion 140 may be curved to be convex in the (−) direction of the X-axis direction. The central solder portion 140 may include a lower surface 140*a* formed on a lower portion thereof. The lower surface 140*a* of the central solder portion 140 may be configured to come into contact with a surface of the board 20.

The fitting nail 100 may include one pair of lateral reinforcement portions 130 extended from both ends of the upper surface 100 in the (−) direction of the x-axis direction. Each of the one pair of lateral reinforcement portions 130 may include a first outer wall terminal 131 which is curved downward from one end of the lateral reinforcement portion 130 and is extended to come into contact with an outer surface 220*a* of the second sidewall 220. Each of the one pair of lateral reinforcement portions 130 may include an additional terminal 160 which is spaced apart from the first outer wall terminal 131 to provide electrical connection separately from the first outer wall terminal 131. The additional terminal 160 may include a plurality of terminals 161, 162 positioned on surfaces facing each other, for example. Each of the one pair of lateral reinforcement portions 130 may include a second outer wall terminal 161 which is spaced apart from the first outer wall terminal 131 in the second direction and is curved downward and extended to come into contact with the outer surface 220*a* of the second sidewall 220. Each of the one pair of lateral reinforcement portions 130 may include a first inner wall terminal 162 which is spaced inward from the second outer wall terminal 161 and is curved downward and extended to come into contact with an inner surface 220*b* of the second sidewall 220.

Each of the one pair of lateral reinforcement portions 130 may include a lateral solder portion 150 which is extended downward from at least one of the first outer wall terminal 131 and the second outer wall terminal 161. The lateral solder portion 150 may be extended downward and may be curved convexly. The lateral solder portion 150 may be curved to be convex in the opposite direction of a direction in which the outer surface of the lateral reinforcement portion 130 faces. That is, the lateral solder portion 150 may be curved to be convex in the (+) direction or (−) direction of the y-axis direction. The lateral solder portion 150 may include a lower surface 150*a* formed on a lower portion thereof. The lower surface 150*a* of the lateral solder portion 150 may be extended in parallel. The lower surface 140*a* of the central solder portion 140 and the lower surface 150*a* of the lateral solder portion 150 may be configured to directly contact a target (for example, a board) on which the plug connector to which the fitting nail 100 is coupled is mounted.

For example, the lateral solder portion 150 may be extended downward from the first outer wall terminal 131. At least a portion of the lateral solder portion 150 may be extended between the second outer wall terminal 161 and the first inner wall terminal 162. Specifically, at least a portion of the lateral solder portion 150 may be extended between the second outer wall terminal 161 and the first inner wall terminal 162 in the (−) direction of the x-axis direction, while being spaced apart from the second outer wall terminal 161 and the first inner wall terminal 162, respectively.

The lower surface 150*a* of the lateral solder portion 150 extended between the second outer wall terminal 161 and the first inner wall terminal 162 may be positioned on lower portions between the second outer wall terminal 161 and the first inner wall terminal 162, but may not be in contact with all of the second outer wall terminal 161 and the first inner wall terminal 162. The lateral solder portion 150 may be further extended in the second direction, and a length of the lateral solder portion 150 in the second direction may be longer than a length of the first outer wall terminal 131 in the second direction. In addition, the lateral solder portion 150 may be further extended in the second direction, and the length of the lateral solder portion 150 in the second direction may be longer than a length of the second outer wall terminal 161 in the second direction.

In FIG. 1, the central reinforcement portion 120 of the fitting nail 100 may enclose at least a portion of the upper surface of the first sidewall 210 and may be curved downward and extended to come into contact with at least a portion of an outer surface 210*a* of the first sidewall 210 of the connector main body 200. In the following description, the upper surface may refer to a portion on which the upper surface 110 of the fitting nail 100 is formed. The central reinforcement portion 120 may be curved downward from a side of the upper surface in the x-axis direction, and may enclose the outer surface 210*a* of the first sidewall 210. The central reinforcement portion 120 may be extended in a direction of going away from the recess 250 and may be curved downward.

The central reinforcement portion 120 may be positioned on the first sidewall 210 to provide a terminal for electrical connection. The central reinforcement portion 120 may provide a terminal for electrical connection on the outer surface 210*a* of the first sidewall 210. For example, the terminal for electrical connection may be positioned in the at least one recess 125 formed on the central reinforcement portion 120. The recess 125 of the plug connector 10 may be formed to be concave in order to maintain a press-fitting state and electrical connection with a protrusion (not shown) corresponding to the receptacle connector. The recess 125 may be depressed from an outer surface of the central reinforcement portion 120 by a predetermined distance. The extended reinforcement portion 115 may be disposed to face the central reinforcement portion 120, and may provide a terminal for electrical connection on an inner surface 210*b* of the first sidewall 210.

When the plug connector 10 comes into contact with a corresponding terminal (not shown) of the receptacle connector for electrical connection, a portion of the corresponding terminal of the receptacle connector may be inserted into the recess 125. Herein, the corresponding terminal may refer to a configuration that comes into contact with the central reinforcement portion 120 and is electrically connected, and is not limited to a specific shape or a specification configuration. As a portion of the corresponding terminal of the receptacle connector is inserted into the recess 125 of the plug connector 10, contact stability between the central reinforcement portion 120 and the corresponding terminal may be enhanced. A user may feel a sense of coupling between the central reinforcement portion 120 and the corresponding terminal (for example, a sound or a vibration generated when they are coupled) due to the presence of the recess 125.

The fitting nail 100 may include the central solder portion 140 which is further extended downward from the lower end of the central reinforcement portion 120. FIG. 1 illustrates only a portion of the central solder portion 140 that is exposed to the outside.

In FIG. 1, each of the one pair of lateral reinforcement portions 130 of the fitting nail 100 may be extended from both ends of the upper surface 110 in the second direction and may come into contact with an upper end of the second sidewall 220. Each of the one pair of lateral reinforcement portions 130 may be curved downward while enclosing at least a portion of the upper surface of each of the one pair of second sidewalls 220. Each of the one pair of lateral reinforcement portions 130 may provide the terminals 131, 161, 162 for electrical connection to enclose portions of the outer surface 220*a* and the inner surface 220*b* of each of the one pair of second sidewalls 220.

The first outer wall terminal 131 may enclose a portion of the upper surface of the second sidewall 220 and may be curved downward and extended to come into contact with at least a portion of the outer surface 220*a* of the second sidewall 220 of the connector main body 200. At least a portion of the first outer wall terminal 131 may be exposed to the outside to provide a separate contact point for electrical connection on the outer surface 220*a* of the second sidewall 220.

The second outer wall terminal 161 may be spaced apart from the first outer wall terminal 131 in the x-axis direction, and may enclose a portion of the upper surface of the second sidewall 220 and may be curved downward and extended to come into contact with at least a portion of the outer surface 220*a* of the second sidewall 220 of the connector main body 200. At least a portion of the second outer wall terminal 161 may be exposed to the outside. The second outer wall terminal 161 and the first outer wall terminal 131 may provide electrical contact terminals which are spaced apart from each other on the outer surface 220*a* of the second sidewall 220 of the connector main body 200, respectively.

The first inner wall terminal 162 may enclose the other portion of the upper surface of the second sidewall 220 and may be curved and extended downward. Herein, the other portion of the upper surface of the second sidewall 220 may refer to a predetermined portion of the other portion except for the portion of the upper surface of the second sidewall 220 that is enclosed by the second outer wall terminal 161. The first outer wall terminal 162 may enclose the other portion of the upper surface of the second sidewall 220 and may be curved downward and extended to come into contact with at least a portion of the inner surface 220*b* of the second sidewall 220. At least a portion of the first inner wall terminal 162 may be connected with the first outer wall terminal 131. The first inner wall terminal 162 may be exposed to the outside. The first inner wall terminal 162 may provide an electrical contact terminal to the inner surface 220*b* of the second sidewall 220.

The plug connector 10 may include a plug terminal 300 including a plurality of terminals 310 for electrical connection. The plurality of terminals 310 may provide contact points (signal terminals) for electrical connection on an outside and an inside of the second sidewall 200 of the connector main body 200, respectively. The plug terminal 300 may be positioned between the pair of fitting nails 100. The plug terminal 300 may be disposed to be spaced apart from the lateral reinforcement portion 130 by a predetermined distance.

Figure 3:
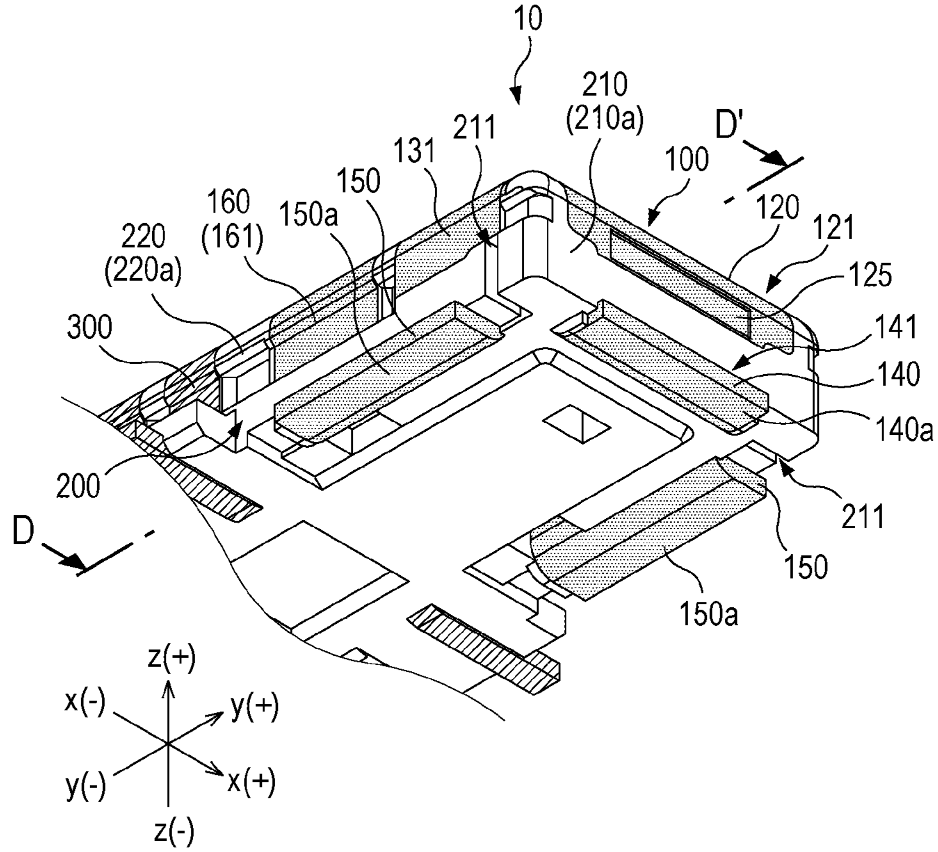
FIG. 3 is an enlarged perspective view of a portion of a lower surface of the plug connector shown in FIG. 1.
Figure 4:
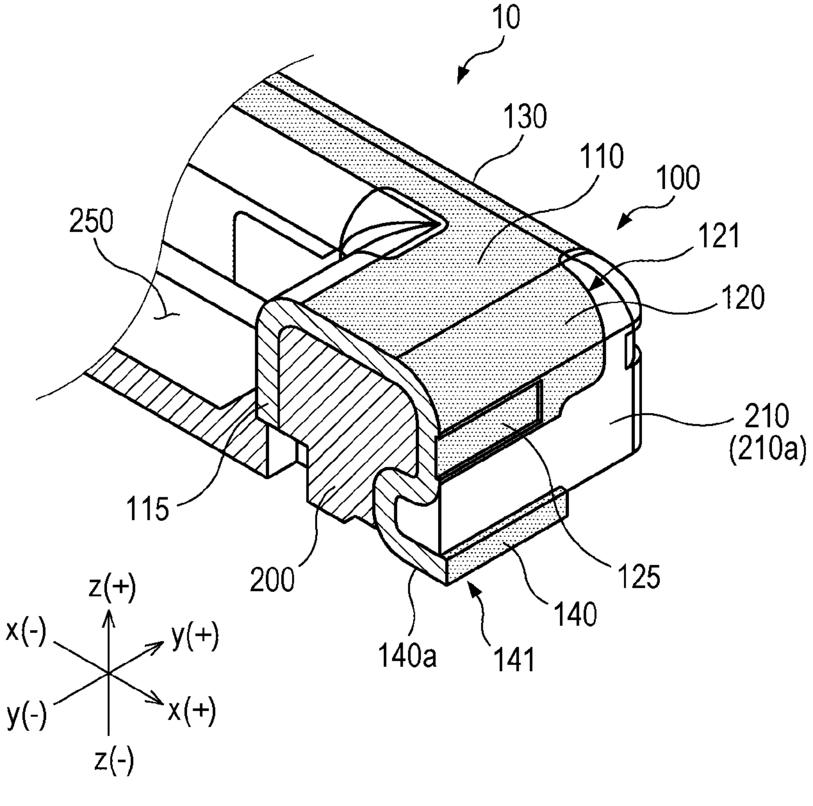
FIG. 4 is a cross-sectional perspective view of the plug connector shown in FIG. 3, taken on line D-D'.

FIG. 3 is an enlarged perspective view of a portion of the plug connector 10 shown in FIG. 1. FIG. 4 is a cross-sectional perspective view of the plug connector shown in FIG. 3, taken on line D-D'.

The upper surface 110 and the central reinforcement portion 120 of the fitting nail 100 may be exposed to the outside while enclosing the upper surface and the outer surface 210*a* of the first sidewall 210. A portion of the central solder portion 140 may be embedded in the first sidewall 210 of the connector main body 200 by over-molding. The exposed portion of the central reinforcement portion 120 that is not embedded may form an electrical contact terminal.

The central solder portion 140 of the fitting nail 100 may be curved to be convex in a direction ((−) direction of the x-axis direction) from the outer surface 210*a* of the first sidewall 210 toward the inner surface 210*b* of the first sidewall 210, and then the curved end may reach the outer surface 210*a* of the first sidewall 210. The curved end of the central solder portion 140 may further protrude to the outside than the outer surface 210*a* of the first sidewall 210. The curved end of the central solder portion 140 may enclose at least a portion of the lower surface of the first sidewall 210. The curved portion of the central solder portion 140 may be embedded in the first sidewall 210 of the connector main body 200.

When the plug connector 10 is mounted on a board, the lower surface 140*a* of the central solder portion 140 may be configured to come into contact with the board 20. For example, the lower surface 140*a* of the central solder portion 140 may be positioned lower than the lower surface of the first sidewall 210, and thus may come into contact with the board 20 earlier than the connector main body 200 when the plug connector 10 comes into contact with the board 20.

The one pair of fitting nails 100 may be over-molded in the connector main body 200. For example, the one pair of fitting nails 100 may be over-molded or full over-molded at both ends of the connector main boy 200. The connector main body 200 may be formed with a material that allows an over-molding process to be performed, and the material may be, for example, plastic, resin, etc. The over-molding is a method for injection molding different materials (elements) all together. For example, an insulation material may be molded in a mold as the connector main body 200, and at least a portion of the one pair of fitting nails 100 and the plug terminal 300 may fill. Accordingly, the connector main body 200, the one pair of fitting nails 100, and the plug terminal 300 may form the plug connector 10.

Referring to FIG. 2C, when the one pair of fitting nails 100 are over-molded in the connector main body 200, a movement prevention mechanism such as a jig may be inserted into a gap space 111 formed under the lateral reinforcement portion 130. That is, with the movement prevention mechanism being inserted into the gap space 111 of the one pair of fitting nails 100, the one pair of fitting nails 100 may be over-molded in the connector main body 200. Herein, the connector main body 200 may not fill a predetermined position where the movement prevention mechanism is inserted. After the fitting nails 100 are over-molded, the movement prevention mechanism may be removed and a pore 211 may be formed in the connector main body 200. The pore 211 may be formed on a position corresponding to the predetermined position where the movement prevention mechanism is inserted when the fitting nails 100 are over-molded, and may have a shape and a size corresponding to the shape and the size of the movement prevention mechanism.

The one pair of fitting nails 100 may be embedded in the connector main body 200, so that at least a portion of the lower surface 140*a* of the central solder portion 140 is exposed to a lower side, and the other portion of the central solder portion 140 is not exposed. For example, at least a portion of the lower surface 140*a* of the central solder portion 140 may be exposed to the outside. The other portion of the central solder portion 140 (a portion except for the at least portion of the lower surface 140*a* of the central solder portion 140) may be embedded in the first sidewall 210 of the connector main body 200. The other portion of the central solder portion 140 that is embedded in the first sidewall 210 of the connector main body 200 may not be exposed to the outside. That is, the central reinforcement portion 120 and the exposed portion of the central solder portion 140 may be separated from each other with the connector main body 200 being disposed therebetween. Accordingly, a direct electrical flow that may be formed by a solder wick on the other portion of the central solder portion 140 embedded in the connector main body 200 may be prevented by the connector main body 200.

An exposed portion 141 of the central solder portion 140 and an exposed portion 121 of the central reinforcement portion 120 may be separated from each other by the connector main body 200 with the connector main body 200 being disposed therebetween. The exposed portion 141 of the central solder portion 140 and the exposed portion 121 of the central reinforcement portion 120 are separated from each other with the connector main body 200 being disposed therebetween, so that a solder wick can be prevented from occurring on the central reinforcement portion 120 (for example, a contact point portion of the central reinforcement portion 120) along the central solder portion 140. That is, the other portion of the central solder portion 140 is embedded in the connector main body 200, so that a solder wick that may occur along the central solder portion 140 can be prevented by the connector main body 200.

Figure 5:
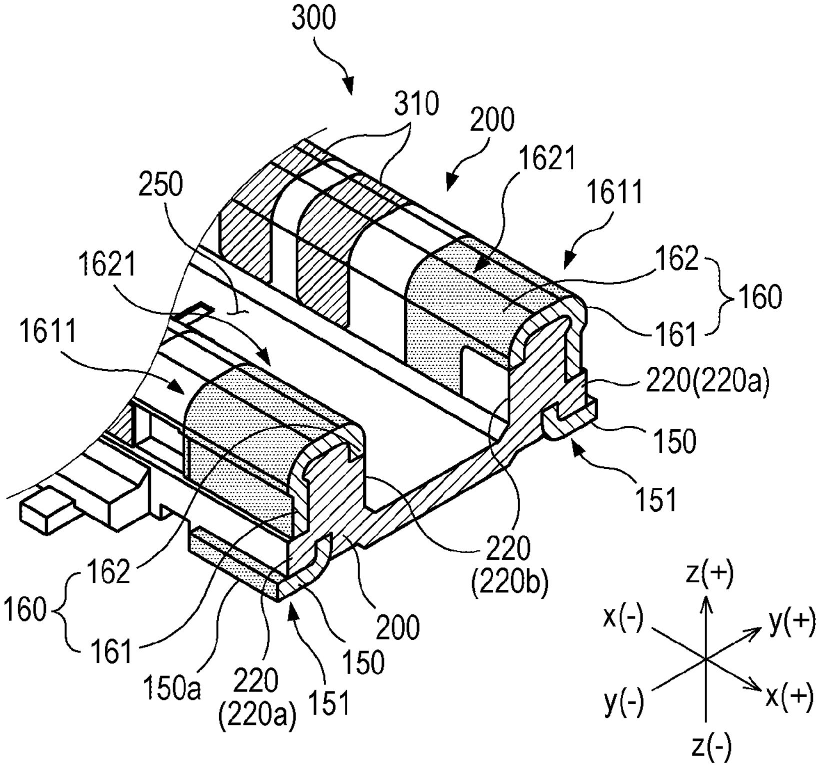
FIG. 5 is a cross-sectional perspective view of the plug connector shown in FIG. 1, taken on line B-B'.
Figure 6:
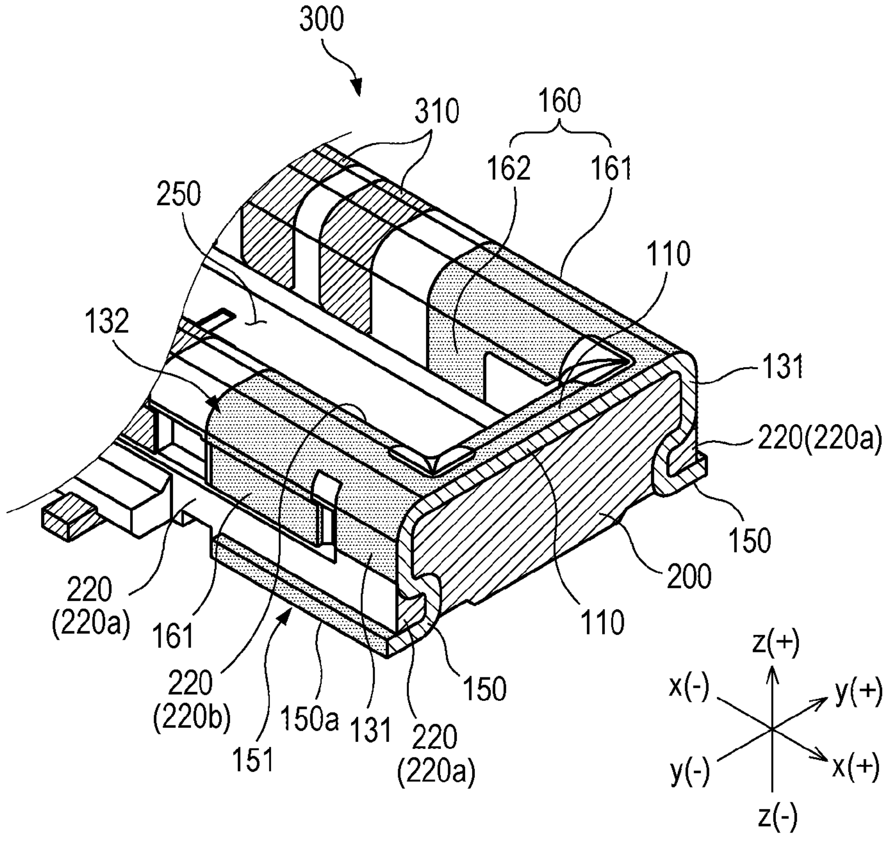
FIG. 6 is a cross-sectional perspective view of the plug connector shown in FIG. 1, taken on line C-C'.

FIG. 5 is a cross-sectional perspective view of the plug connector shown in FIG. 1, taken on line B-B'. FIG. 6 is a cross-sectional perspective view of the plug connector shown in FIG. 1, taken on line C-C'.

At least a portion of the lateral solder portion 150 may be extended from the first outer wall terminal 131. At least a portion of the lateral solder portion 150 may be curved to be convex in a direction from the outer surface 220*a* of the second sidewall 220 toward the inner surface 220*b* of the second sidewall 220 ((±) direction of the y-axis direction or (−) direction of the y-axis direction), and then the curved end may reach the outer surface 220*a* of the second sidewall 220. The curved end of the lateral solder portion 150 may further protrude to the outside than the outer surface 220*a* of the second sidewall 220. An exposed portion 151 of the lateral solder portion 150 may be spaced apart from an exposed portion 1611 of the second outer wall terminal 161 and an exposed portion 1621 of the first inner wall terminal 162. The exposed portion 151 of the lateral solder portion 150 may be positioned under the second outer wall terminal 161 and the first inner wall terminal 162 while being spaced apart from the second outer wall terminal 161 and the first inner wall terminal 162 by a predetermined distance, respectively.

The exposed portion 151 of the lateral solder portion 150 may include the lower surface 150*a* configured to come into contact with the board 20 (see FIG. 1). The lower surface 150*a* of the lateral solder portion 150 may be configured to come into contact with the board 20 when the plug connector 10 is mounted on the board 20. For example, the lower surface 150*a* of the lateral solder portion 150 may be positioned lower than the lower surface of the second sidewall 220 of the connector main body 200, and thus may come into contact with the board 20 earlier than the connector main body 200 when the plug connector 10 comes into contact with the board 20.

As shown in FIGS. 5 and 6, the one pair of fitting nails 100 may be embedded in the connector main body 200, so that the first outer wall terminal 131 and the second outer wall terminal 161 are exposed to the outside, the first inner wall terminal 162 is exposed to the inside, and the one pair of lateral solder portions 150 are exposed to the lower side. Accordingly, a direct electrical flow that may be formed by a solder wick on the other portion of the lateral solder portion 150 embedded in the connector main body 200 may be prevented by the connector main body 200.

The exposed portion 151 of the lateral solder portion 150 and an exposed portion 132 of the lateral reinforcement portion 130 may be separated from each other with the connector main body 200 being disposed therebetween. The exposed portion 151 of the lateral solder portion 150 and the exposed portion 132 of the lateral reinforcement portion 130 may be separated from each other by the connector main body 200 with the connector main body 200 being disposed therebetween. The exposed portion 151 of the lateral solder portion 150 and the exposed portion 132 of the lateral reinforcement portion 130 are separated from each other with the connector main body 200 being disposed therebetween, so that a solder wick can be prevented from occurring on the lateral reinforcement portion 130 (for example, a contact point portion of the lateral reinforcement portion 130) along the lateral solder portion 150. That is, the other portion of the lateral solder portion 150 is embedded in the connector main body 200, so that a solder wick that may occur along the lateral solder portion 150 can be prevented by the connector main body 200.

As described above, in the plug connector 10 according to an embodiment, the exposed portion 141 of the central solder portion 140 and the exposed portion 121 of the central reinforcement portion 120 may be separated from each other with the connector main body 200 being disposed, and the exposed portion 151 of the lateral solder portion 150 and the exposed portion 132 of the lateral reinforcement portion 130 may be separated from each other with the connector main body 200 being disposed therebetween.

Accordingly, when the plug connector 10 is mounted on the board 20 by surface mount technology, a solder wick can be prevented from occurring on the central reinforcement portion 120 and the lateral reinforcement portion 130. When the solder wick occurs at a contact point portion of the central reinforcement portion 120 (for example, the recess 125 of the central reinforcement portion 12), and a contact point portion of the lateral reinforcement portion 130 (for example, the first outer wall terminal 131, the second outer wall terminal 161, and/or the first inner wall terminal 162 of the lateral reinforcement portion 130), a contact failure of the plug connector 10 may occur, and temperature of the plug connector 10 may increase due to an unstable contact resistance. This may cause a defect on the plug connector 10 and the board 20 on which the plug connector 10 is mounted. In the plug connector 10 according to an embodiment, a solder wick is prevented from occurring at the contact point of the central reinforcement portion 120 and the contact point of the lateral reinforcement portion 130, and stable electrical connection can be provided. In addition, the plug connector 10 can be prevented from being damaged or broken by the solder wick, and hardness of the plug connector 10 may increase and durability of the plug connector 10 may be enhanced.

In the plug connector 10 according to an embodiment, a plurality of power terminals (three power terminals on each lateral reinforcement portion 130) may be formed on each fitting nail 100. Accordingly, a stable electrical contact point may be guaranteed and stable electrical connection is possible even at a high current. In addition, since the area of the lateral solder portion 150 of the fitting nail 100 may increase, the contact failure of the connector 10 can be prevented and adhesion to a board can be enhanced.

FIG. 7 is a cross-sectional view when the plug connector shown in FIG. 1 comes into contact with a corresponding connector.

For example, a corresponding connector mounted on a corresponding board 50 may be a receptacle connector 1000. The plug connector 10 may be inserted into the receptacle connector 1000, so that the plug connector 10 and the receptacle connector 1000 are electrically connected. The second outer wall terminal 161 and the first inner wall terminal 162 of the plug connector 10 may provide terminals for electrical connection, respectively.

The second outer wall terminal 161 and the first inner wall terminal 162 of the plug connector 10 may come into contact with a receptacle terminal 1010 of the receptacle connector 1000, respectively, thereby being electrically connected. A projection 165 may be formed on the second outer wall terminal 161 of the plug connector 10 to secure the receptacle terminal 1010. The projection 165 is formed, so that the electrical connection between the second outer wall terminal 131 and the receptacle terminal 1010 can be more stably maintained. Of course, the central reinforcement portion 120 and the first outer wall terminal 131 of the plug connector 10 may also come into contact with a receptacle central terminal (not shown) and a receptacle terminal (not shown) of the receptacle connector 1000, thereby being electrically connected. In addition, additional electrical connection may be provided by the plug terminal 300 of the plug connector 10 and a plug terminal (not shown) of the receptacle connector 1000. As the plug connector 10 and the receptacle connector 1000 are electrically connected, the board 20 on which the plug connector 10 is mounted and the corresponding board 50 on which the receptacle connector 1000 is mounted may be electrically connected.

Although the technical concept of the present disclosure has been described through some embodiments described above and examples illustrated in the accompanying drawings, it should be noted that various substitutions, modifications, and changes can be made without departing from the technical concept and the scope of the present disclosure that can be understood by those skilled in the art to which the present disclosure belongs. In addition, the substitutions, modification, and changes should be deemed to belong to the claims attached hereto.

The invention claimed is:

1. A plug connector for a board-to-board connector, the plug connector comprising:

a connector main body which comprises one pair of first sidewalls extended in a first direction and facing each other, and one pair of second sidewalls extended in a second direction perpendicular to the first direction and facing each other;

one pair of fitting nails which are coupled to the connector main body; and a plurality of plug terminals which are coupled to the one pair of second sidewalls, wherein each of the one pair of fitting nails comprises:

an upper surface which is in contact with an upper end of the first sidewall;

a central reinforcement portion which is curved downward from the upper surface to come into contact with at least a portion of an outer surface of the first sidewall; and one pair of lateral reinforcement portions which are extended from both ends of the upper surface in the second direction to come into contact with an upper end of the second sidewall, wherein the central reinforcement portion comprises a central solder portion which is extended downward from a lower end of the central reinforcement portion and encloses at least a portion of a lower surface of the first sidewall, wherein each of the one pair of lateral reinforcement portions comprises:

a first outer wall terminal which is extended downward;

a second outer wall terminal which is spaced apart from the first outer wall terminal in the second direction and is extended downward; and a first inner wall terminal which is spaced inward from the second outer wall terminal and is extended downward, wherein each of the one pair of lateral reinforcement portions comprises a lateral solder portion which is extended downward from at least one of the first and second outer wall terminals and encloses at least a portion of a lower surface of the second sidewall.

2. The plug connector of claim 1, wherein the central solder portion is extended downward from the lower end of the central reinforcement portion, is curved to be convex toward an inner surface of the first sidewall, and encloses at least a portion of the lower surface of the first sidewall.

3. The plug connector of claim 1, wherein the central solder portion is extended downward from the first outer wall terminal, is curved to be convex toward an inner surface of the first sidewall, and encloses at least a portion of the lower surface of the second sidewall.

4. The plug connector of claim 1, wherein the lateral solder portion is further extended in the second direction, and a length of the lateral solder portion in the second direction is longer than a length of the first outer wall terminal in the second direction.

5. The plug connector of claim 1, wherein the one pair of fitting nails are embedded in the connector main body, so that the central reinforcement portion is exposed, at least a portion of a lower surface of the central solder portion is exposed to a lower side, and the other portion of the central solder portion is not exposed, wherein an exposed portion of the central reinforcement portion and the exposed portion of the lower surface of the central solder portion are separated from each other and are exposed with the connector main body being disposed therebetween, and wherein the exposed portion of the central reinforcement portion forms an electrical contact terminal.

6. The plug connector of claim 1, wherein the one pair of fitting nails are embedded in the connector main body, so that the first outer wall terminal and the second outer wall terminal are exposed to an outside, the first inner wall terminal is exposed to an inside, and the one pair of lateral solder portions are exposed to a lower side, wherein an exposed portion of a lower surface of the lateral solder portion and exposed portions of the lateral reinforcement portion are separated from each other and are exposed with the connector main body being disposed therebetween.

7. The plug connector of claim 1, wherein at least one recess is formed on the central reinforcement portion as an electrical contact terminal.

8. A connector assembly comprising: a plug connector according to claim 1; and a receptacle connector engaged with the plug connector.

* * * * *